United States Patent [19]

Kawai et al.

[11] 4,162,667
[45] Jul. 31, 1979

[54] ELECTRONIC IGNITION TIMING CONTROL SYSTEM FOR INTERNAL COMBUSTION ENGINES

[75] Inventors: Hisasi Kawai, Toyohashi; Kazuo Iwase, Okazaki, both of Japan

[73] Assignee: Nippon Soken, Inc., Nishio, Japan

[21] Appl. No.: 868,314

[22] Filed: Jan. 10, 1978

[30] Foreign Application Priority Data

Feb. 3, 1977 [JP] Japan .................................. 52-10900

[51] Int. Cl.² .............................................. F02P 5/04
[52] U.S. Cl. ............................................... 123/117 D
[58] Field of Search ......................... 123/117 R, 117 D

[56] References Cited

U.S. PATENT DOCUMENTS

| | | | |
|---|---|---|---|
| 3,955,723 | 5/1976 | Richards | 123/117 D |
| 4,063,539 | 12/1977 | Gorille et al. | 123/117 D |
| 4,127,092 | 11/1978 | Fresow | 123/117 D |

*Primary Examiner*—Ronald B. Cox
*Attorney, Agent, or Firm*—Cushman, Darby & Cushman

[57] ABSTRACT

An electronic ignition timing control system for an internal combustion engine which comprises a rotational angle detector for detecting a rotational angle of the engine to produce output pulses, a reference angle detector for detecting a reference rotational angle of the engine to produce a reset pulse, an ignition angle computing circuit for converting by interpolation the advance angles corresponding to principal points of engine parameter address into the retard angles from the reference angle to produce a first output signal indicative of an angle corresponding to the rotational angle of the engine and a second output signal indicative of the delay time corresponding to an angle smaller than the first output signal value, a first comparator to digitally compare the first output value of the ignition angle computing circuit with the number of the output pulses of the rotational angle detector, and a second comparator to convert the second output value of the ignition angle computing circuit into a time period whereby the instant that the conversion is completed is selected as desired ignition timing.

8 Claims, 8 Drawing Figures

ELECTRONIC IGNITION TIMING CONTROL SYSTEM FOR INTERNAL COMBUSTION ENGINES

BACKGROUND OF THE INVENTION

The present invention relates to an electronic ignition timing control system for electronically determining the ignition timing of an internal combustion engine (hereinafter referred to as an engine).

With a distributor of the type which has heretofore been used widely for timing the ignition of an engine, the relative positions of the elements in an assembly of a cam and electric contacts employing points are changed in accordance with the engine speed and the intake vacuum which are respectively detected by a centrifugal governor and a vacuum advancer so as to generate an ignition signal at the ignition timing that suits the engine operating conditions.

However, the distributor of the above type is disadvantageous in that since all the controls are accomplished mechanically, the accuracy of the resulting ignition timing cannot be fully satisfactory and it is also difficult to obtain an ideal ignition timing characteristic, thus giving rise to problems from the standpoint of exhaust emission control which has become an issue.

An electronic ignition system has been proposed in which the preset advance angle is divided by the speed of an engine and converted into a time so as to time the ignition of the engine. A disadvantage of this type of system is that since the engine speed is measured, a certain time is required for measuring the engine speed and consequently the value of the measured engine speed represents the average engine speed over the measuring time, thus causing an error when the engine speed changes during the measuring time. Another system has been proposed in which in consideration of this disadvantage, the ignition of an engine is timed by detecting the slits formed in the circumferential portion of a disk and each corresponding to a predetermined crank angle. In practice, however, if each slit corresponds to 2° in crank angle degrees and the disk is mounted on the crankshaft, 180 slits must be formed in the disk and this system will be considered impractical in consideration of the available slit forming capacity and the ability and durability of the available slit detecting sensors.

SUMMARY OF THE INVENTION

With a view to overcoming the foregoing deficiencies, it is the object of this invention to provide an electronic ignition timing control system for an internal combustion engine which is designed to time the ignition of the engine by reading out from predetermined programmes the desired retard angles from a predetermined reference angular position of the engine before the top dead center, for example, in accordance with the engine speed and other factor necessary for determining the advance angle, e.g., the intake vacuum, obtaining the desired value through interpolation and dividing it into a group of higher bits and a group of lower bits, further dividing the lower bits by the engine speed to convert into a time value indicative of a delay time, and then performing comparision between the higher bits and the output signals of rotational angle detecting means adapted to detect the rotational angle of the engine to generate a pulse for every predetermined degrees of engine rotation and between the time value and the clock pulses of a fixed frequency, thus responding to rapid changes with greater accuracy, ensuring stable operation against variations in the power supply voltage and the external conditions, e.g., the ambient temperature, making it possible to reduce the cost and standardize the assemblying operation, also making it easy to change the ignition timing characteristic and to reduce considerably the number of advance angle values to be programmed, and also ensuring the highly accurate ignition timing with a simple construction.

DESCRIPTION OF THE PREFERRED EMBODIMENT

The present invention will now be described in greater detail with reference to the illustrated embodiment.

Figure 1:
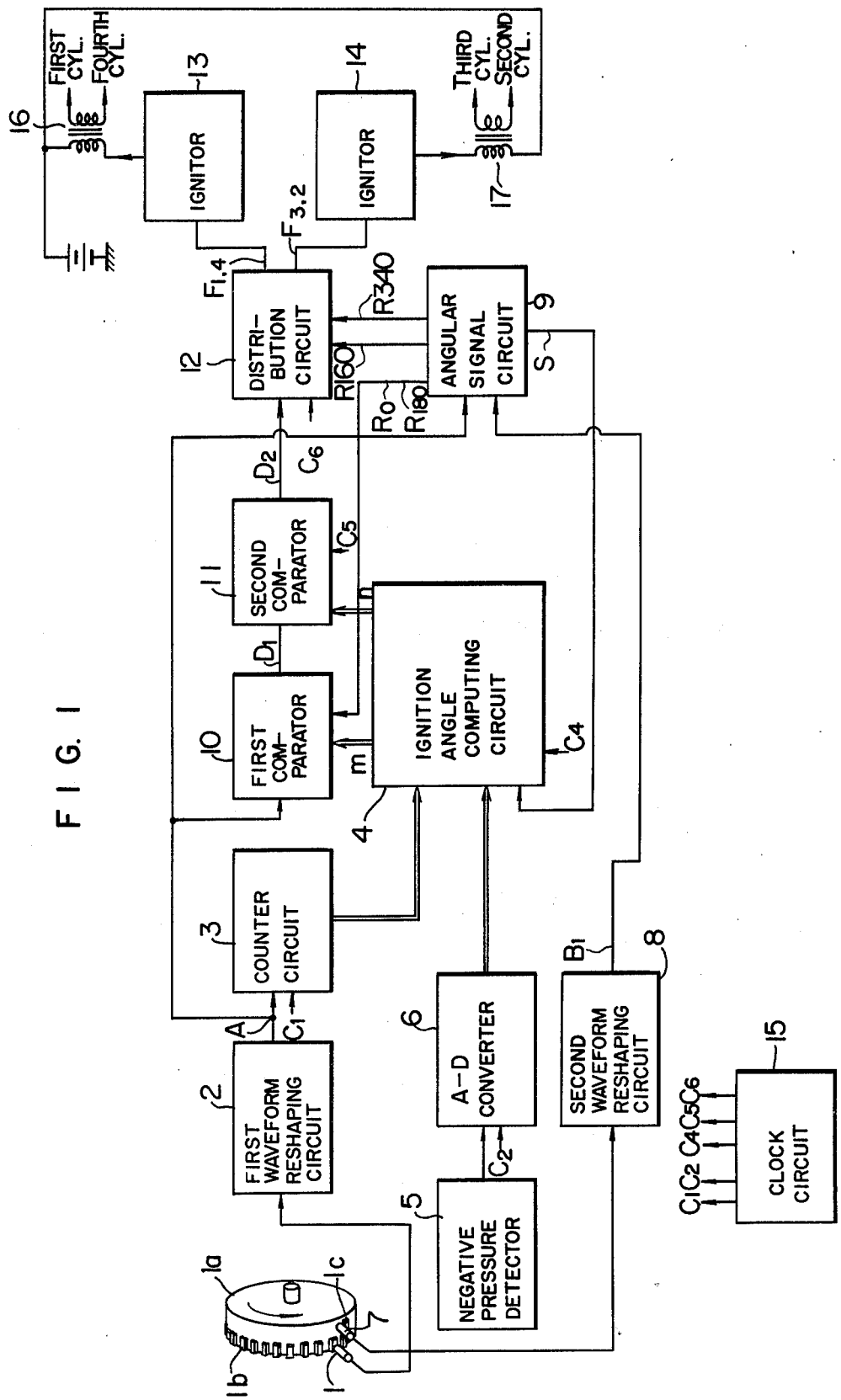
FIG. 1 is a block diagram showing a general construction of an embodiment of a system according to the invention.

Referring first to the block diagram of FIG. 1 illustrating a general construction of an embodiment of a system according to the invention, numeral 1 designates rotational angle detecting means comprising an electromagnetic pickup mounted to detect engine speed by utilizing a ring gear 1a of a four-cylinder, four-cycle engine, and its output detection signal has a frequency of 1150 Hz at the engine speed of 600 rpm if the number of teeth 1b on the ring gear 1a is 115. Numeral 2 designates a waveform reshaping circuit of the known type which amplifies and converts the output signal of the electromagnetic pick-up 1 into a rectangular wave, and 3 a counter circuit for measuring the engine speed in response to the output signals A of the waveform reshaping circuit 2 and the clock pulses $C_1$ from a clock circuit 15 which will be described later and generating an output in binary code form. Numeral 5 designates a semiconductor-type negative pressure detector mounted in the intake pipe of the engine to detect the negative pressure in the intake pipe and generate an analog voltage output. Numeral 6 designates an A-D converter in which the output voltage of the negative pressure detector 5 is converted into binary code form in response to the clock pulses $C_2$ from the clock circuit 15 and the A-D converter 6 includes a memory circuit.

Numeral 1c designates a tooth formed on the ring gear 1a for the purpose of detecting a reference angular position, and it is provided at a position 60 degrees before the top dead center of the number one cylinder.

Figure 2A:
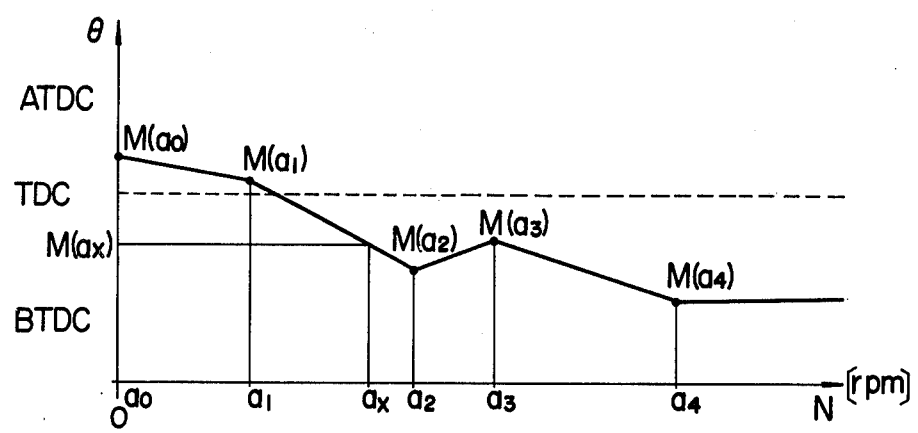
FIGS. 2(a) and 2(b) are characteristic diagrams showing the retard angle characteristics stored in the read only memories of the ignition angle computing circuit shown in FIG. 1.
Figure 2B:
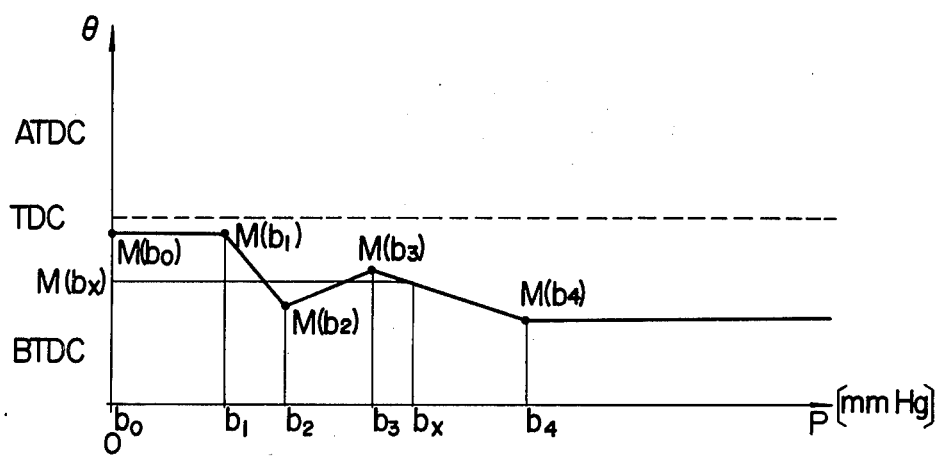

Numeral 7 designates reference angle detecting means comprising an electromagnetic pickup adapted to detect the position of the tooth $1c$. Numeral 8 designates a second waveform reshaping circuit for amplifying and converting the output signal of the electromagnetic pickup 7 into a rectangular wave. Numeral 4 designates an ignition angle computing circuit which receives the binary code output of the counter circuit 3 as an engine speed address and the binary code output of the A-D converter circuit 6 as a vacuum address. As regards the engine speed addresses, as shown in FIG. 2(a), the retard angles corresponding to the principal points, i.e., $a_0$ to $a_4$ of the engine speed addresses are divided by $360/115 \approx 3.13$ representative of the crank angle per tooth $1b$ of the ring gear $1a$ and the resulting values are programmed into the ignition angle computing circuit 4. Similarly, as shown in FIG. 2(b), the retard angles corresponding to the principal points, i.e., $b_0$ to $b_4$ of the vacuum addresses are divided by the same value of 3.13 and the resulting values are programmed into the ignition angle computing circuit 4. Thus, the ignition angle computing circuit 4 obtains by interpolation the value corresponding to any given address from the programmed values and the input addresses and generates a first output and a second output. In FIGS. 2(a) and 2(b), symbols TDC, BTDC and ATDC on the ordinate respectively designate the top dead center, before top dead center and after top dead center.

Numeral 9 designates an angular signal circuit responsive to the output signals A of the first waveform reshaping circuit 2 and the output signals $B_1$ of the second waveform reshaping circuit 8 to generate angular signals $R_0$, $R_{160}$, $R_{180}$ and $R_{340}$ respectively at predetermined crank angles of the number one cylinder of the engine and a data selection signal S. Here, $R_0$ designates the position of that tooth $1b$ of the ring gear $1a$ which corresponds to and closest to 60 degrees before the top dead center of the number one cylinder, and similarly $R_{160}$, $R_{180}$ and $R_{340}$ respectively designate the positions of the teeth $1b$ which respectively correspond to or closest to 160°, 180° and 340° in terms of retard angles from $R_0$. Numerals 10 and 11 designate first and second comparators, and the first comparator 10 is reset by each of the reference angular signals $R_0$ and $R_{180}$ from the angular signal circuit 9 to start the comparison operation, so that at the instant that the number of the output pulses of the first waveform reshaping circuit 2 attains the m-bit data or first output of the outputs of the ignition angle computing circuit 4, an output signal $D_1$ is generated to reset the second comparator 11. When this occurs, the second comparator 11 starts the comparison operation so that when the number of the clock pulse $C_5$ applied from the clock circuit 15 attains the n-bit data or second output of the outputs of the ignition angle computing circuit 4, an output signal $D_2$ is generated. This output signal $D_2$ constitutes an ignition timing signal.

A distribution circuit 12 is a circuit which is responsive to the angular signals $R_{160}$ and $R_{340}$ from the angular signal circuit 9 to generate signals $F_{1,4}$ and $F_{3,2}$ for distributing the output signal $D_2$ of the second comparator 11 to the cylinders in two groups respectively comprising the number one and four cylinders and the number three and two cylinders. Numerals 13 and 14 designate ignitors of the known type adapted to respectively power amplify the output signals $F_{1,4}$ and $F_{3,2}$ of the distribution circuit 12 and actuate double ignition coils 16 and 17. The double ignition coil 16 is connected to the spark plugs of the number one and four cylinders and the double ignition coil 17 is connected to the spark plugs of the number two and three cylinders. Numeral 15 designates the clock circuit comprising a rectangular wave oscillator, a frequency divider for dividing the frequency of the oscillator output, a waveform reshaping circuit for generating pulses of a narrow pulse width and a logic circuit for generating the clock pulses $C_1$, $C_2$, $C_4$, $C_5$ and $C_6$ constituting the reference timing signals applied to the associated blocks.

The principal blocks will now be described. Although not shown, the counter circuit 3 comprises a NAND gate adapted to be opened by the output signals of the waveform reshaping circuit 2 to pass the clock pulses $C_1$ from the clock circuit 15 that will be described later, a counter for counting the clock pulses passed through the NAND gate, a latch circuit (temporary memory circuit) for temporarily storing the count value of the counter to determine by its output binary code an engine speed address for the ignition angle computing circuit 4 and a signal generator which is responsive to the output signals A of the waveform reshaping circuit 2 to generate a reset signal for the counter and a storage command signal for the latch circuit.

Next, the ignition angle computing circuit 4 will be described. The ignition angle computing circuit 4 employs a microcomputer (The Toshiba TLCS-12A). Here, only the controlling computational operations of the circuit will be described, and its construction and operation will not be described. The output of the counter circuit 3 is applied as an engine speed address in the form of an 8-bit binary code which corresponds to the engine speed N, and similarly the output of the A-D converter circuit 6 is applied as a vacuum address in the form of an 8-bit binary code corresponding to the intake vacuum P. In the ignition angle computing circuit 4, the necessary instruction words and an advance characteristic are programmed into each read-only memory (hereinafter simply referred to as an ROM), and no detailed specific examples of these instruction words will be described since they only relate to the manner in which the controls are performed, although the procedure will be described later. As regards the advance angle characteristics, those shown in FIGS. 2(a) and 2(b) are used, namely, shown in FIG. 2(a) is the engine speed advance characteristic with the abscissa representing the engine speed in rpm and the output of the counter circuit 3 is applied as an input address. In relation to the respective input addresses $a_0$, $a_1$, $a_2$, $a_3$ and $a_4$ on the abscissa, the corresponding advance angles $\theta$ of $M(a_0)$, $M(a_1)$, $M(a_2)$, $M(a_3)$ and $M(a_4)$ are programmed on the ordinate. Each of the advance angles $M(a_0)$ to $M(a_4)$ represents the value obtained by converting the predetermined desired advance angle $\alpha$ into the corresponding retard angle from the reference position $R_0$ and then dividing it by 3.13°. Shown in FIG. 2(b) is the vacuum advance characteristic with the abscissa representing the intake negative pressure, and the output of the A-D converter circuit 6 is applied as an input address. Thus, in relation to the respective input addresses $b_0$, $b_1$, $b_2$, $b_3$ and $b_4$ on the abscissa, the corresponding advance angles $\theta$ of $M(b_0)$, $M(b_1)$, $M(b_2)$, $M(b_3)$ and $M(b_4)$ are programmed on the ordinate. Each of the advance angles $M(b_0)$ to $M(b_4)$ represents the value obtained by converting the predetermined desired advance angle $\alpha$ into the corresponding retard angle from the reference position $R_0$ and then dividing it by 3.13°.

In operation, assuming that the engine speed address is $a_x$, for example, the address $a_x$ is examined to see in which of the ranges $a_0$ to $a_1$, $a_1$ to $a_2$, $a_2$ to $a_3$ and $a_3$ to $a_4$ the address $a_x$ falls. If the address $a_x$ falls in the range $a_1$ to $a_2$, there holds $$M(a_x) = M(a_1) + \frac{M(a_2) - M(a_1)}{a_2 - a_1} \times (a_x - a_1) \quad (1)$$

Thus, the interpolation value $M(a_x)$ is determined from the computation of the equation (1). In the like manner, when the vacuum address is $b_x$, the address $b_x$ is examined to determine the corresponding one of the ranges $b_0$ to $b_1$, $b_1$ to $b_2$, $b_2$ to $b_3$ and $b_3$ to $b_4$ in which it falls. If the address $b_x$ falls in the range $b_3$ to $b_4$, there holds, $$M(b_x) = M(b_3) + \frac{M(b_4) - M(b_3)}{b_4 - b_3} \times (b_x - b_3) \quad (2)$$

Thus, the interpolation value $M(b_x)$ is determined from the computation of the equation (2). Next, the following sum is obtained.

$M(a_x)+M(b_x)-KA$(only when the data selection signal S is at "1")$-KB$(only when the data selection signal S is at "0")$=M+M'$ (where $M=A_4\times 2^4+A_3\times 2^3+A_2\times 2^2+A_1\times 2^1+A_0\times 2^0$, and
$M'=B_1\times 2^{-1}+B_2\times 2^{-2}+B_3\times 2^{-3}+B_4\times 2^{-4}$) (3)

Figure 5:
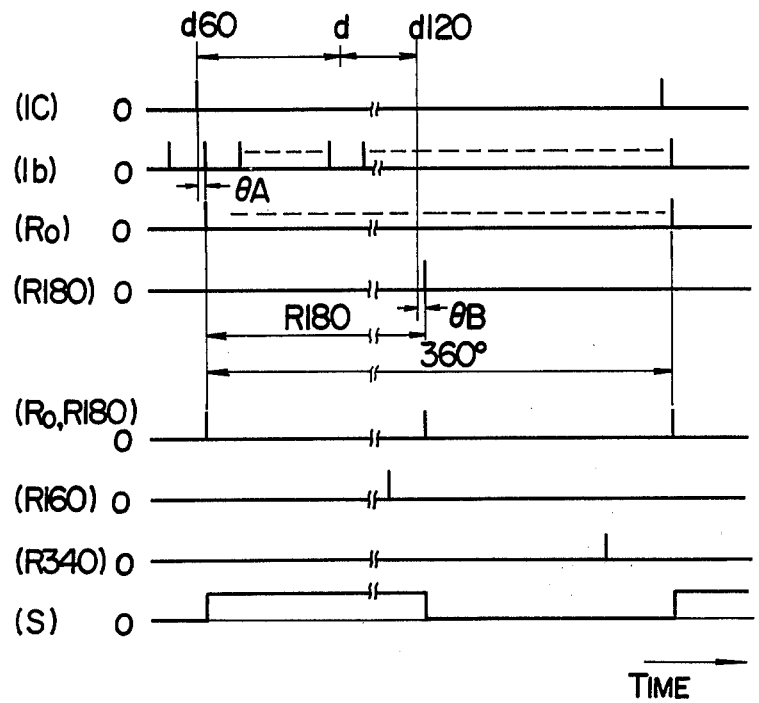
FIG. 5 is a waveform diagram useful for explaining the operation of the angular signal circuit shown in FIG. 4.

Here, M utilizes the angle (3.13°) corresponding to every tooth $1b$ of the ring gear $1a$ as a unit number, and M' represents an angle smaller than 3.13°. The correction factors KA and KB are necessary because of the fact that in practice there occurs a deviation between the position of the teeth $1b$ of the ring gear $1a$ and the top dead center and that there is another deviation due to the errors in the relative mounting positions of the rotational angle detecting means 1 and the reference angle detecting means 7. These two reasons necessitate the provision of compensations. These two compensation values are constant. It is assumed that the waveforms shown in FIG. 5 represent the deviations due to the mounting errors of the two detecting means and the deviation between the teeth of the ring gear and the top dead center. In the Figure, (IC) represents the output signals of the second waveform reshaping circuit 8 which reshapes the output waveform of the reference angle detecting means 7, and ($1b$) represents the output signals of the first waveform reshaping circuit 2 which reshapes the output waveform of the rotational angle detecting means 1. Assuming now that a point d represents the position of the top dead center of the number one cylinder and $d_{60}$ represents the position which is advanced 60° with respect to the position of d, then the position of the corresponding tooth $1b$ on the ring gear $1a$ is slightly deviated from the point $d_{60}$ as shown in ($1b$). Assume that this angular difference is represented by $\theta_A$. Of course, this angular difference $\theta_A$ has a value smaller than 3.13°. Also, precisely the position of the reference angle signal ($1c$) is of course deviated from the point $d_{60}$ and consequently the actual reference angular position cannot be satisfactorily accurate in the case of the waveform shown in ($1c$). As a result, if the position $R_0$ of the tooth $1b$ on the ring gear $1a$ which is retarded from but closest to the point $d_{60}$ is employed as a reference position, the required mounting accuracy for the reference angle detecting means can be eased and made reliable. The differential angle between the positions $R_0$ and $d_{60}$ represents $\theta_A$. Consequently, if the necessary comparison is effected in the first comparator 10, since $R_0$ is used as the reference position, it is necessary to provide the corresponding correction. Similarly, assuming that $d_{120}$ represents the reference position for determining the ignition timing of the number three and two cylinders, i.e., the angular position retarded 180° from the point $d_{60}$ or 120° from the point d and that $R_{180}$ represents the position of the tooth on the ring gear $1a$ which is after but closest to the point $d_{120}$, there of course exists a deviation between the positions $R_{120}$ and $R_{180}$. Thus, if this deviation is represented by $\theta_B$, the resulting output representing the total retard angle must be corrected by an amount corresponding to $\theta_B$. As a result, utilizing the same dimension, it is necessary to make a correction (subtractive correction in this embodiment) by a value $A/3.13=KA$ in the case of the ignition timing of the number one and four cylinders and by a value $B/3.13=KB$ in the case of the ignition timing of the number three and two cylinders. These correction quanties KA and KB are preliminarily programmed into the ROMs in the ignition angle computing circuit 4 so that the correction quantity KA is subtracted when the data selection signal S from the angular signal circuit 9 is at the "1" level, while on the other hand, when the data selection signal is at the "0" level, the correction quantity KB is subtracted. In the equation (3), M is an integer and corresponds in angle to $M\times 3.13°$. This M is converted by the first comparator 10 into an angle corresponding to the teeth $1b$ on the ring gear $1a$.

Then, M' is divided by the engine speed address value $a_x$ to obtain $M''=K\cdot M'/a_x$ (K=constant). Here, M' represents the angle smaller than 3.13° and considering the meaning of M", $1/a_x$ represents the period which is proportional to the time required for the ring gear $1a$ to make one rotation or rotate 360 degrees. If M' represents an angle, the time M" required for the rotation of M' is given by $360°:K_1/a_x=M':M''$ (where $K_1$ is a constant), and consequently M" represents in terms of time an angle at a given engine speed. M is an output data representing an angle and applied to the first comparator 10, and M" is an output data representing a time and applied to the second comparator 11. Thus, the necessary instruction words for effecting these operations are programmed into the ROMs in the ignition angle computing circuit 4.

Figure 3:
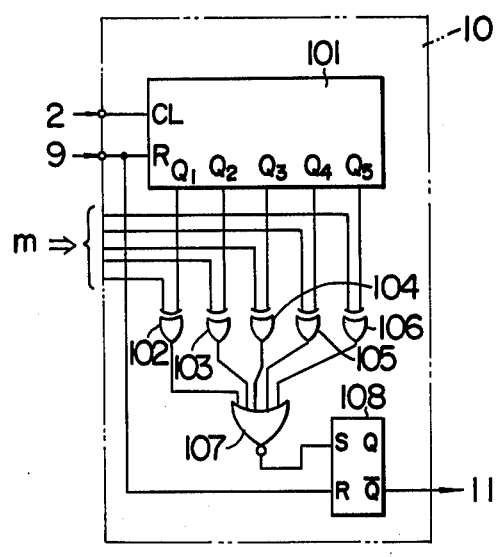
FIG. 3 is a block diagram showing the construction of the comparator shown in FIG. 1.

Next, the first comparator 10 will be described. As shown in FIG. 3, the first comparator 10 comprises a binary counter 101, EXCLUSIVE OR gates 102, 103, 104, 105 and 106, a NOR gate 107 and an R-S flip-flop 108. As a result, when the binary counter 101 and the R-S flip-flop 108 are reset in response to the reset signal $R_0$ or $R_{180}$ from the angular signal circuit 9, the binary counter 101 starts counting the angle signals from the first waveform reshaping circuit 2. Every pulse of these angle signals corresponds to 3.13° in terms of crank angle degrees. When the count value attains the binary output or the first m-bit output value M of the outputs from the ignition angle computing circuit 4, all the outputs of the EXCLUSIVE OR gates 102 to 106 go to "0," so that the output of the NOR gate 107 goes to "1" and the R-S flip-flop 108 is set. The degrees of rotation from the time that the R-S flip-flop 108 is reset until it is set, namely, the time during which a "1" is being generated at the $\overline{Q}$ output terminal of the R-S flip-flop 108, is proportional to the output binary output indicative of the first output value M of the ignition angle computing circuit 4. It is important to note here that the instant at which the output signal at the $\bar{Q}$ output of the R-S flip-flop 108 goes from "1" to "0" corresponds to the retard angle indicated by the first output value M of the ignition angle computing circuit 4. Since the input pulses to the first comparator 10 are the output of the first waveform reshaping circuit 2 which represents the crank angle itself, if a change occurs in the crankshaft rotation in the course of the counting, this can be directly reflected in the counting. The second comparator 11 is identical in circuit construction with the first comparator 10 except that the number of the counter bits, the number of the EXCLUSIVE OR gates and the number of the inputs of the NOR gate are changed to suit the number of input bits n. In this embodiment, a 10-bit counter, 10 EXCLUSIVE OR gates and a 10-input NOR gate are used. The input clock pulses to the second comparator 11 consist of the output signals of the clock circuit 15, i.e., the clock pulses $C_5$ of a fixed frequency which is 500 KHz. The output signal of the first comparator 10 is applied as a reset signal to the counter and the R-S flip-flop. Also, the 10 bits of the second output value M″ of the ignition angle computing circuit 4 are applied as an input data to the second comparator 11. Thus, when the output signal of the first comparator 10 goes from "1" to "0," the counter in the second comparator 11 starts the counting operation so that when the number of the clock pulses $C_5$ received attains the second output value M″ indicative of the output value M′ of the ignition angle computing circuit 4 converted into the delay time corresponding to the then current engine speed, the output of the second comparator 11 goes from "1" to "0." Consequently, the instant at which the output goes from "1" to "0" corresponds to the 4-bit retard angle indicated by the output value M′ of the ignition angle computing circuit 4 at the then current engine speed. Thus, the instant at which the output of the second comparator 11 goes from "1" to "0" corresponds to the desired ignition timing.

Figure 4:
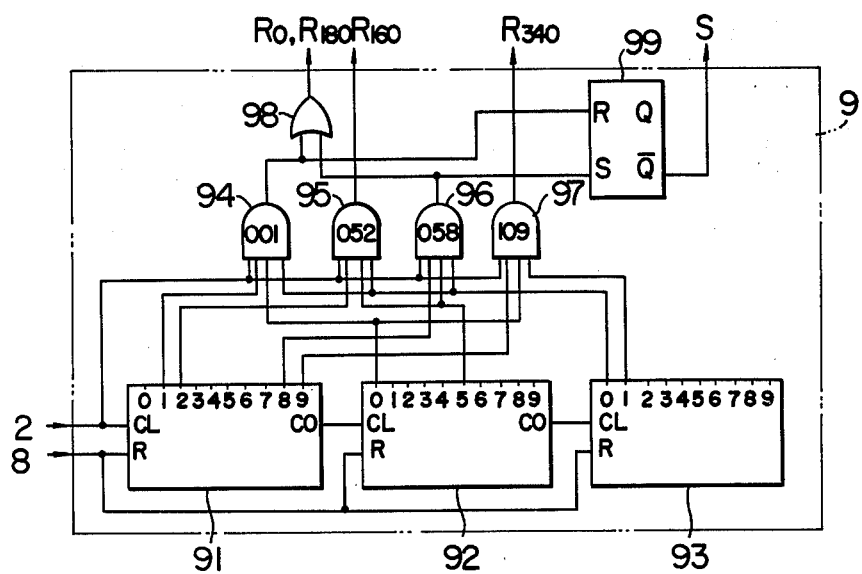
FIG. 4 is a block diagram showing the construction of the angular signal circuit shown in FIG. 1.

Next, the angular signal circuit 9 will be described with reference to FIGS. 4 and 5. The angular signal circuit 9 comprises divider/decade counters 91, 92 and 93, four-input AND gates 94, 95, 96 and 97, an OR gate 98 and an R-S flip-flop 99. The counter 91 has its clock input coupled to the output of the first waveform reshaping circuit 2 shown in (1b) of FIG. 5 and its reset input coupled to the output of the second waveform reshaping circuit 8 shown in (1c) of FIG. 5. The counter 92 has its clock input connected to the carry-out output of the counter 91 and its reset input connected to the reset input of the counter 91. The counter 93 has its clock input connected to the carry-out output of the counter 92 and its reset input connected to the reset input of the counter 92. Of these component elements, the counters 91, 92 and 93 serve as divider/decade counters which count from 0 to 999. The AND gate 94 is a gate which generates the previously mentioned signal $R_0$ and its four inputs are respectively connected to the input clock terminal and "1" output terminal of the counter 91 and the "0" output terminals of the counters 92 and 93, thus producing the angular signal $R_0$ shown in ($R_0$) of FIG. 5. The AND gate 95 performs the AND operation on the signals respectively generated at the input clock terminal and "2" output terminal of the counter 91, the "5" output terminal of the counter 92 and the "0" output terminal of the counter 93, thus generating the angular signal $R_{160}$ shown in ($R_{160}$) of FIG. 5. The AND gate 96 performs the AND operation on the signals respectively generated at the input clock terminal and "8" output terminal of the counter 91, the "5" output terminal of the counter 92 and the "0" output terminal of the counter 93, thus generating the signal $R_{180}$ shown in ($R_{180}$) of FIG. 5. The AND gate 97 performs the AND operation on the signals respectively generated at the input clock terminal and "9" output terminal of the counter 91, the "0" output terminal of the counter 92 and the "1" output terminal of the counter 93, thus generating the angular signal $R_{340}$ in ($R_{340}$) of FIG. 5. The OR gate 98 performs the OR operation on the signals $R_0$ and $R_{180}$, thus generating the angular signals $R_0$ and $R_{180}$ shown in ($R_0$, $R_{180}$) of FIG. 5. The R-S flip-flop 99 has its reset input connected to the output of the AND gate 94 to receive the signal $R_0$ and its set input connected to the output of the AND gate 96 to receive the signal $R_{180}$, thus generating at its output the data selection signal S shown in (S) of FIG. 5. It is to be noted here that the signals $R_0$, $R_{160}$, $R_{180}$ and $R_{340}$ are related to the corresponding teeth $1b$ of the ring gear $1a$, namely, the signal $R_0$ corresponds to the first tooth $1b$ following the arrival of the reference angle signal $B_1$ and consequently the angular difference $\theta_A$ between the reference angle signal $B_1$ and the signal $R_0$ is less than 3.13°. The signal $R_{160}$ corresponds to the 52nd tooth $1b$ and consequently it is given in terms of crank angle degrees by $(52-1)\times 3.13°+\theta_A=159.63°+\theta_A$. The signal $R_{180}$ corresponds to the 58th tooth $1b$ and is given by $(58-1)\times 3.13°+\theta_A=178.41°+\theta_A$, and the signal $R_{340}$ corresponds to the 109th tooth $1b$ and is given by $(109-1)\times 3.13°+\theta_A=338.04°+\theta_A$.

Figure 6:
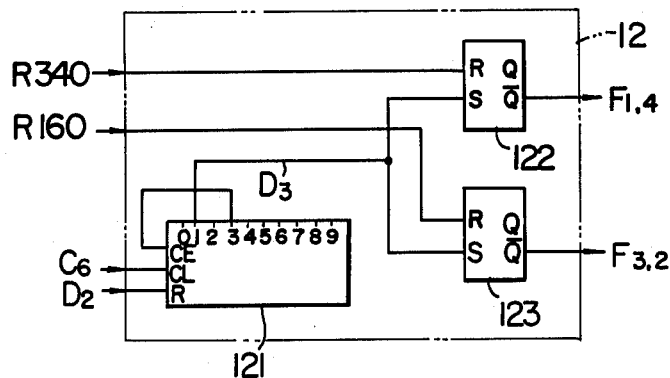
FIG. 6 is a block diagram showing the construction of the distribution circuit shown in FIG. 1.
Figure 7:
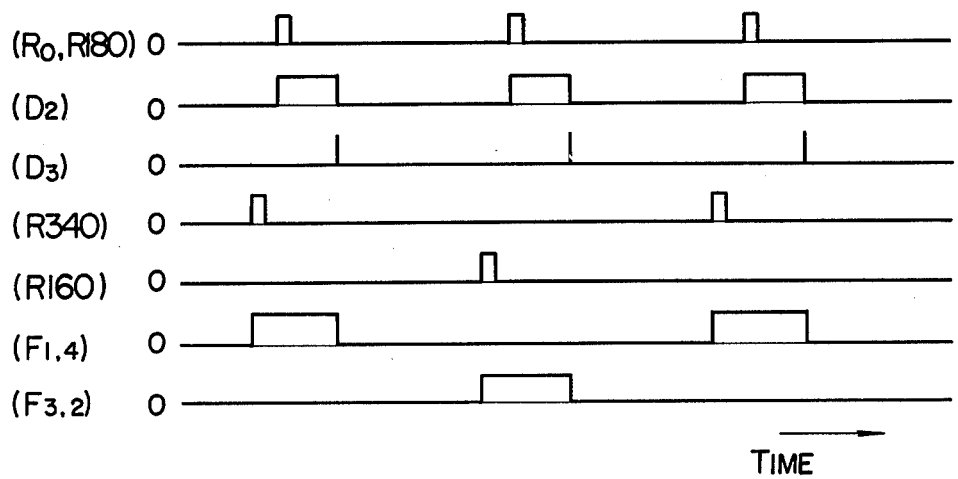
FIG. 7 is a waveform diagram useful for explaining the operation of the distribution circuit 12 shown in FIG. 6.

Next, the distribution circuit 12 will be described with reference to FIG. 6. The distribution circuit 12 comprises a divider/counter 12, and R-S flip-flops 122 and 123. The divider/counter 121 has its clock input connected to the output of the clock circuit 15 which generates clock pulses $C_6$ (1 MHz), its reset input connected to the output $D_2$ of the second comparator 11 and its "3" output terminal connected to its clock enable terminal CE to inhibit the counting of more than 3 clock pulses. The "1" output of the counter 121 is connected to the set terminal of the R-S flip-flops 122 and 123, respectively. The R-S flip-flop 122 has its reset terminal connected to the $R_{340}$ output of the angular signal circuit 9, and the reset terminal of the R-S flip-flop 123 is connected to the $R_{160}$ output of the angular signal circuit 9. FIG. 7 shows the waveforms useful for explaining the operation of the distribution circuit 12. FIG. 7 ($D_2$) shows the output signal of the second comparator 11, ($D_3$) the output waveform of the divider/counter 121, ($F_{1,4}$) the output of the R-S flip-flop 122, and ($F_{3,2}$) the output of the R-S flip-flop 123. The waveform ($F_{1,4}$) means the ignition signal for the number one and four cylinders, and the waveform ($F_{3,2}$) means the ignition signal for the number three and two cylinders. It will thus be seen that the distribution circuit 12 serves the function of determining the time width of ignition signals and distributing the ignition signals to the two cylinder groups. The signal in ($F_{1,4}$) is subjected to power amplification by the ignitor 13 and used to energize the double ignition coil 16. When the signal in ($F_{1,4}$) is at "1," current is supplied to the primary coil of the double ignition coil 16, and when the "0" level signal is on, the current flow in the primary coil is interrupted. When the current flow is interrupted, a high voltage is produced in the secondary coil of the ignition coil 16 and this high voltage is directly applied to the spark plugs of the first and fourth cylinders, thus producing ignition sparks. The secondary coil of the double ignition coil 16 has its one end connected to the spark plug of the number one cylinder and its other end connected to the spark plug of the number four cylinder. The function of the double coil is well known in the art and will not be described. The signal in ($F_{3,2}$) serves the similar function and causes the spark plugs of the second and third cylinders to produce the ignition sparks.

While, in the above-described embodiment, the ignition angle computing circuit 4 employs a microcomputer, the circuit may of course be composed of individual IC circuits.

Further, while, in the above-described embodiment, the rotational angle detecting means and the reference angle detecting means are composed of electromagnetic pickups, each of these means may of course comprise a HALL element, photodetecting means consisting of a light emitting diode and a phototransistor or high frequency type detecting means which stops oscillating when a piece of material approaches.

Further, while, in the above-described embodiment, the engine speed and intake vacuum are detected as the necessary engine parameters, the amount of intake air may be detected in place of the intake vacuum, and it is also possible to additionally detect other parameters, such as, the engine cooling water temperature, exhaust gas quantity and the like so as to control the degree of spark advance.

Further, while, in the above-described embodiment, the distribution circuit 12 and the double ignition coils 16 and 17 are used to eliminate the distributor, the present invention may be embodied in any ordinary ignition system having a distributor.

Further, while, in the above-described embodiment, the positions of the teeth on the ring gear are detected by the rotational angle detecting means and the reference angle detecting means whose outputs are applied to the angular signal circuit 9 which in turn generates the required reference angular signals for the cylinders, it is possible to arrange so that a magnetic disk having a large number of teeth dividing the entire disk circumference into a large number of equal parts (e.g., 40 equal parts) and another teeth dividing the entire disk circumference into as many equal parts as there are the cylinders, is mounted on the shaft (e.g., the engine cam shaft) which is rotated at one half the engine speed, whereby the former teeth are detected by rotational angle detecting means comprising an electromagnetic pickup to generate angle signals and the latter teeth are detected by reference angle detecting means comprising an electromagnetic pickup to generate the required reference angle signals for the cylinders.

It will thus be seen from the foregoing that the system of this invention has a great advantage that it comprises rotational angle detecting means for generating an output pulse for every predetermined degrees of rotation of an internal combustion engine, reference angle detecting means for detecting a reference rotational angle of the engine to generate a reset pulse each time the reference rotational angle is detected, an ignition angle computing circuit into which are programmed the values obtained by utilizing the values of engine parameters as addresses, converting the advance angles corresponding to the principal points of the parameter addresses into the retard angles from the reference angle and dividing the same by the predetermined rotational angle to be detected by the rotational angle detecting means whereby the retard angles corresponding to the parameter addresses are obtained by interpolating between the associated programmed values and outputted in the form of a first output value indicative of an angle corresponding to the rotational angle detected by the rotational angle detecting means and a second output value indicative of the delay time corresponding to an angle smaller than the first output value, a first comparator adapted to be reset by the reset pulse from the reference angle detecting means to digitally compare the first output value of the ignition angle computing circuit with the number of the output pulses of the rotational angle detecting means and thereby to generate an output signal when the number of the output pulses attains the first output value, and a second comparator adapted to be reset by the output signal of the first comparator to convert the second output value of the ignition angle computing circuit into a time width in response to the clock pulses of a fixed frequency whereby the instant that the conversion is completed is selected as the desired ignition timing to generate an output signal, thus making it possible to suitably respond to rapid changes in the engine speed by means of the first and second output values with a high degree of accuracy, making it possible to construct practically the entire circuitry with digital operational elements and thereby ensuring stable operation against variation in the power supply voltage and the external conditions such as the ambient temperature and the like, making it possible to reduce the cost and standardize the assembling operations by virtue of the utilization of integrated circuits, making it easy to change the ignition timing characteristic due to a change in the intended use or type of the engine by simply changing the programs, making it possible to considerably reduce the number of advance angles to be programmed by virtue of the use of interpolation operation, and ensuring the very highly accurate ignition timing with a simple construction.

What is claimed is:

1. An electronic ignition timing control system for internal combustion engines comprising:

a rotational angle detector (1, 2) operatively coupled to the ring gear (1a) of the multicylinder engine for producing a rotational angle signal (a) each time one of a plurality of equi-spaced teeth (1b) provided on said ring gear is detected;

a reference angle detector (7, 8) operatively coupled to the ring gear of a multicylinder engine for producing a reference angle signal ($B_1$) each time a tooth (1c) provided on said ring gear is detected, said tooth being positioned to represent the reference position of one cylinder of said multicylinder engine;

a parameter detector (3, 5, 6) for detecting the operating parameter of said multicylinder engine;

an ignition angle computing circuit (4) connected to said parameter detector and including a memory in which a plurality of ignition angle data are memorized as ignition retard angles with respect to said reference angle position in correspondence with a plurality of parameter data, said ignition angle computing circuit proportionally interpolating two of said ignition angle data corresponding to adjacent two of parameter data one and the other of which are respectively larger and smaller than the output value of said condition detector;

an angular pulse circuit (9) connected to said rotational angle detector and said reference angle detector for counting the number of said rotational angle signal in response to said reference angle signal, said angular pulse circuit producing a first and second pulses ($R_0$, $R_{180}$) when the count valve thereof reaches predetermined first and second valves, respectively;

a comparison circuit (10, 11) connected to said rotational angle detector, said ignition angle computing circuit and said angular pulse circuit for comparing the number of rotational angle signal with the output value of said ignition angle computing circuit in response to said first and second pulses to thereby determine first and second ignition timings;

first ignition means (13, 16) for producing a high voltage in synchronism with said first ignition timing and simultaneously applying the high voltage to two cylinders of said multicylinder engine; and second ignition means (14, 17) for producing another high voltage in synchronism with said ignition timing and simultaneously applying the high voltage to other two cylinders of said multicylinder engine.

2. An electronic ignition timing control system according to claim 1, wherein said memory in said ignition angle computing circuit is programmed to read out an ignition angle $\theta$ in accordance with the following equation, $$\theta = a \cdot x/360,$$

where the symbol $a$ is a desired ignition retard angle and the symbol x is the number of said equi-spaced teeth provided on said ring gear, and wherein said ignition angle computing circuit is adapted to produce the output value thereof in plural bits of binary code the higher m bits and the remaining n bits of which correspond respectively to the angle larger than the value $360/x$ and to the time during which said ring gear rotates the angle smaller than the value $360/x$.

3. An electronic ignition timing control system according to claim 2 further comprising a clock circuit for producing a clock pulse at a fixed frequency, and wherein said comparison circuit includes:

a first comparator (10) connected to count the number of said rotational angle signal until the count value thereof reaches the m-bit binary code produced by said ignition angle computing circuit; and a second comparator (11) connected to count the number of said clock pulse after the counting completion of said first comparator until the count value thereof reaches the n-bit binary code produced by said ignition angle computing circuit, said second comparator determining said first and second ignition timings upon counting completion thereof.

4. An electronic ignition timing control system according to claim 3, wherein each of said first and second ignition means includes:

an ignition coil having a primary coil and a secondary coil across which said high voltage is produced; and two spark plugs one and the other of which are connected to one and the other output terminals of said ignition coil, respectively.

5. An electronic ignition timing control system according to claim 4 further comprising:

a distribution circuit connected to said comparison circuit for producing an output signal synchronized with the counting completion of said second comparator and distributing the same to said first and second ignition coils alternatively.

6. A method for controlling ignition timings in multicylinder engines comprising the steps of:

detecting a plurality of equi-spaced rotational angle positions of a multicylinder engine to produce a plurality of rotational angle signals (A) in each rotation of said engine;

detecting a predetermined reference angle position of said multicylinder engine to produce a reference angle signal ($B_1$) in each rotation of said engine;

detecting the rotational speed of said multicylinder engine as a first parameter of said engine to produce a first binary code indicative of the value of said first parameter;

detecting a second parameter of said engine to produce a second binary code indicative of the value of said second parameter;

selecting two adjacent binary addresses of a first memory in which a plurality of ignition retard angles with respect to said first parameter are memorized in correspondence to a plurality of addresses, one and the other of said two addresses being smaller and larger than said first binary code, respectively;

selecting two adjacent binary addresses of a second memory in which a plurality of ignition retard angles with respect to said second parameter are memorized in correspondence to a plurality of addresses, one and the other of said two addresses being smaller and larger than said second binary code, respectively;

interpolating proportionally two ignition retard angles corresponding to said two addresses of said first memory to determine a first ignition retard angle corresponding to said first binary code;

interpolating proportionally two ignition retard angles corresponding to said two addresses of said second memory to determine a second ignition retard angle corresponding to said second binary code;

adding said first and second ignition retard angles to produce a third binary code indicative of the adding result, the higher m bits and the remaining bits of said third binary code being corresponding to the angles larger and smaller than the angle determined by adjacent two of said equi-spaced rotational angle positions;

dividing the binary code represented by said remaining bits of said third binary code by said first binary code to produce a fourth binary code in n bits indicative of the dividing result;

counting the number of said rotational angle signals produced after said reference angle signal until the count value thereof reaches the value represented by said m bits of said third binary code;

producing a train of clock signals at a fixed frequency;

counting the number of said clock signals produced after the completion of said angle signal counting step until the count value thereof reaches the value represented by said n bits of said fourth binary code; and producing a high voltage by an ignition coil in synchronization with the completion of said clock signal counting step.

7. A method for controlling ignition timings according to claim 6, wherein said ignition retard angles $\theta$ memorized in said first and second memories are determined in accordance with the following equation, $$\theta = \alpha/y,$$

where the symbol $\alpha$ is a desired ignition retard angle and the symbol y is the angle determined by adjacent two of said equi-spaced rotational angle positions.

8. A method for controlling ignition timings according to claim 7 further comprising the step of:
applying said high voltage to two cylinders of said multicylinder engine simultaneously.

* * * * *